UNITED STATES PATENT OFFICE.

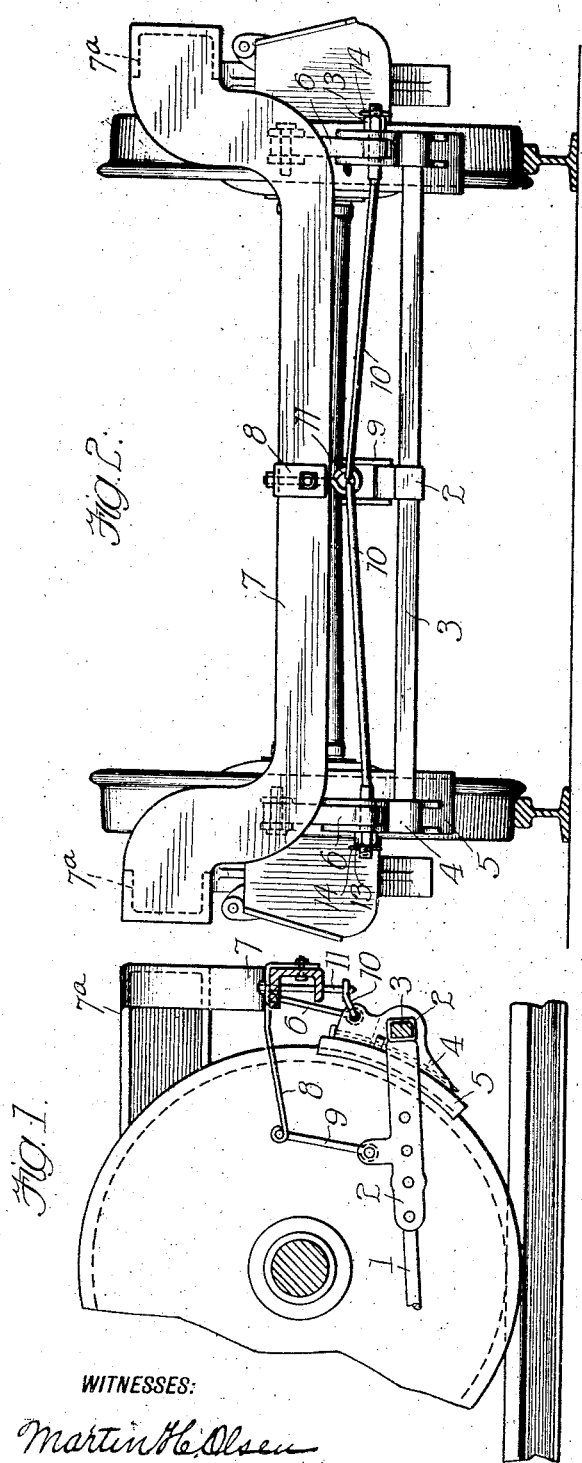

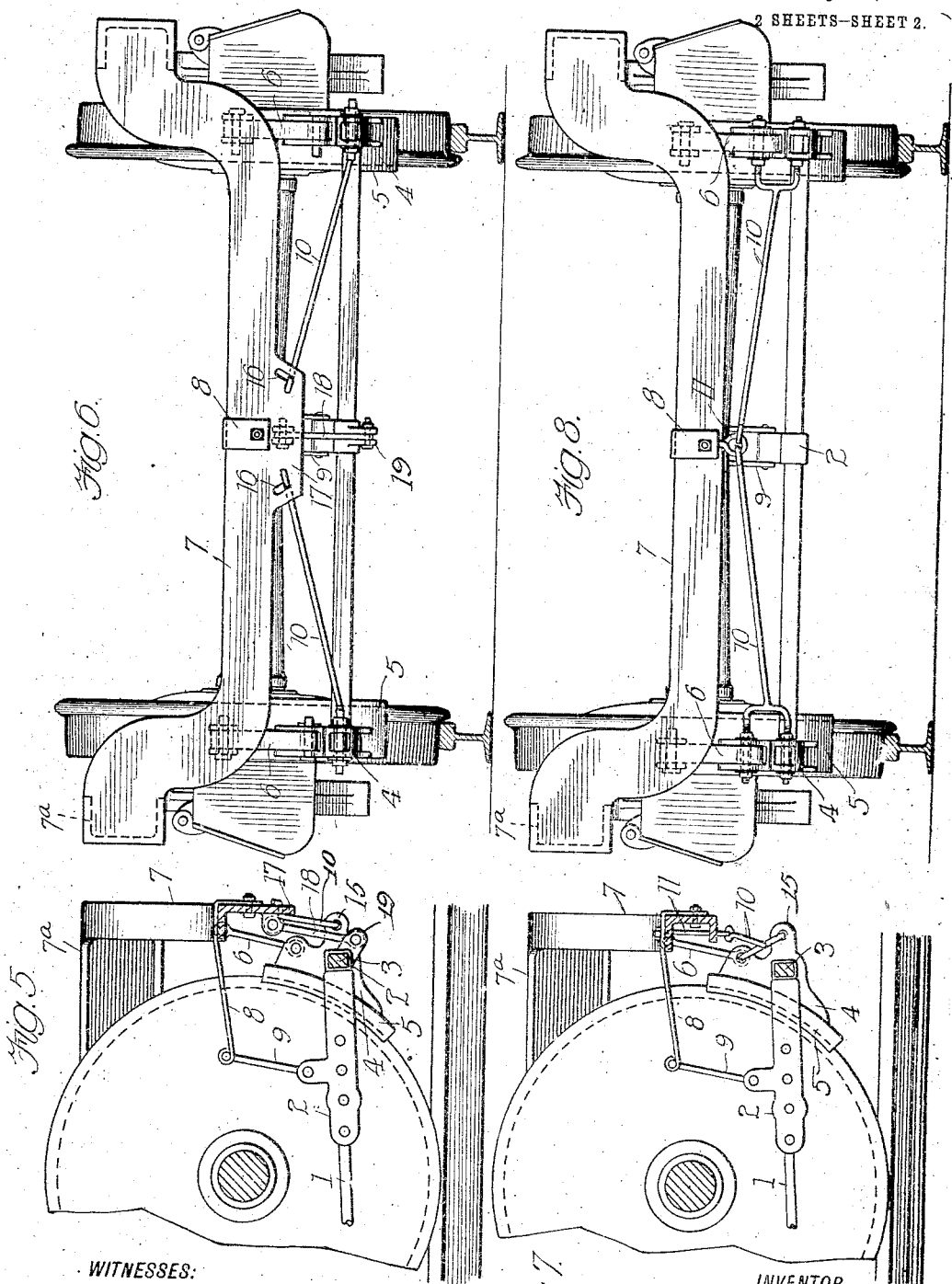

WILLIAM H. JONES, OF CHICAGO, ILLINOIS.

RAILWAY-BRAKE.

1,034,117. Specification of Letters Patent. Patented July 30, 1912.

Application filed October 14, 1911. Serial No. 654,635.

*To all whom it may concern:*

Be it known that I, WILLIAM H. JONES, a citizen of the United States, residing at Chicago, in the county of Cook and State of Illinois, have invented certain new and useful Improvements in Railway-Brakes, of which the following is a description, reference being had to the accompanying drawings, forming a part of this specification.
It has been found in practice that, owing to the lateral movement permitted by the suspension of the ordinary forms of brakes of railway and like cars, there is a tendency for the pairs of brakes to assume an incorrect position, either to one side or the other, frequently to such an extent that a considerable part of the bearing surface of one or both brakes will not contact with the wheel upon which it acts, and wear of the parts under such conditions increases the tendency and results in considerable loss of efficiency, and an uneven wear of the brake apparatus and wheels which is extremely objectionable.

The object of my invention is to remedy such defects by the provision of means for restraining the brake mechanism from lateral movement whereby the entire bearing surface of every shoe is at all times presented to the wheel upon which it acts, and an equal wear on the wheels and both brake-shoes of every pair is attained.

I have illustrated in the drawings which accompany and form a part of this application mechanism which is well adapted to attain the object set forth, and in the appended claims have recited the essential elements of my invention.

Of such drawings, Figure 1 is a side view of a car wheel showing brake mechanism to which my invention is applied; Fig. 2 an end view of parts of a wheel truck and pair of wheels showing the same form of brake mechanism; Figs. 3 and 4 are details showing different forms of attachment of the centering rods to the brake-heads; Figs. 5 and 6 are views corresponding respectively to Figs. 1 and 2 and showing a modified form of my invention; and Figs. 7 and 8 views also corresponding respectively to Figs. 1 and 2 and showing another modification of my invention.

It will be understood that my invention is applied to brake apparatus of ordinary form used on railway cars of usual and well-known construction. The brake rod 1 of the brake apparatus is attached to the fulcrum 2, attached to the center of the brake beam 3, such brake beam carrying on its ends the brake-heads 4, equipped with brake shoes 5 adapted to engage the wheels of the car. The brake heads are suspended by a pair of brake-hangers 6 pivoted to such heads and to pairs of lugs upon the cross-beam 7 of the wheel truck 7ª near the opposite ends of such cross-beam. A balance spring 8 bolted to the center of the cross-beam of the truck and pivotally connected with links 9 which are in turn pivoted to the fulcrum 2 tends to yieldingly lift the brake beam, and through it the brake-heads and brake shoes, so as to yieldingly press the latter upwardly against the wheels. All the parts thus far described are old and well-known in the art, and it will be observed that owing to the swinging suspension of the brake beam and associated parts a greater or less degree of lateral movement is apt to exist. To restrain this I have provided a pair of guide rods 10—10 which at their inner ends (see Fig. 2) are pivoted to an eye bolt 11 which is bolted to the center of the cross-beam 7, and at their outer ends are attached to the brake-heads 4. These rods, in the form of my invention shown in Fig. 2, serve as the pivotal connection between such brake heads and the brake hangers 6.

In Figs. 3 and 4 I have illustrated suitable forms of connection between the rods 10 and the brake heads and hangers, permitting an adjustment for the purpose of securing a proper bearing of the brake shoes upon the wheels whenever it may be necessary. Referring to Fig. 3, a cup-shaped washer 12 is interposed between the threaded nut 13 and the pivotal bearing in the brake head, for the purpose of permitting a comparatively long portion of the end of the rod 10 to be threaded, a cotter pin 14 serving to prevent the nut from coming off. This construction permits a comparatively large range of adjustment, though the simpler form of connection shown in Fig. 4 may be employed, dispensing with the washer 12 and employing a cotter pin which may be passed through any one of several pairs of holes formed in the nut, to hold the nut in different positions and thus provide for various adjustments.

In the form of my invention shown in Figs. 5 and 6 the rods 10 are pivoted to lugs 15 projecting outwardly from the brake heads, and at their inner ends are bent twice at right angles to form a cross pivotal connection and an offset end retaining lug, in order to permit them to be readily inserted into and detached from the elongated bearing slots 16 formed in a depending portion 17 of the cross-beam 7. A safety hanger 18 pivoted to lugs upon the portion 17 of the cross-beam and also pivotally connected to the brake-beam in the present instance through a short bracket 19 fixed thereon is provided to prevent the brake-beam from dropping down upon the track in case of a breakage of its suspension by the brake hangers.

In Figs. 7 and 8 I have shown another modification in which the rods 10 are branched at their outer ends, one branch forming the pivotal connection between the brake head and the brake-hanger, and the other end having a pivotal connection with lugs 15 (as in the construction shown in Figs. 5 and 6) projecting outwardly from the brake-heads, this pivotal connection being located below the horizontal plane of the pivotal connection between the brake-heads and brake-hangers. Each branch is provided with threaded nuts whereby such connections may be independently adjusted, and the brake-heads and brake shoes may be thereby adjusted so that the brake shoes will accurately engage the wheels both at their top and bottom portions.

I claim:

1. In combination with a wheel-truck and wheels carried thereby and with a brake adapted to engage said wheels, a transversely-disposed guide rod pivotally hung at one end upon a fixed part of the truck and at the other end attached to said brake, and arranged to prevent lateral movement of said brake.

2. In combination with a wheel-truck and wheels carried thereby and with a brake adapted to engage said wheels, a guiding device comprising a pair of transversely-disposed rods pivotally hung at their inner ends upon a fixed part of the truck and at their outer ends attached to said brakes.

3. In combination with a wheel-truck having a cross-beam and wheels carried by said truck, and with brake mechanism suspended from said truck and including brake-heads and a brake-beam connecting said brake-heads, a guiding device comprising a pair of transversely disposed rods pivoted at their inner ends centrally of the truck upon a fixed part thereof and at their outer ends attached to said brake heads.

4. In combination with a wheel-truck having a cross-beam and wheels carried by said truck and with brake mechanism suspended from said cross beam and including brake-heads, a guiding device comprising a pair of transversely disposed rods pivotally hung at their inner ends upon said cross-beam and at their outer ends attached to said brake-heads.

5. In combination with a wheel-truck having a cross-beam and wheels carried by said truck, and with brake mechanism including brake-hangers and brake-heads, a guiding device comprising a pair of transversely disposed rods pivotally hung at their inner ends upon said cross-beam, and at their outer ends arranged to pivotally connect said brake-heads with said brake-hangers.

6. In combination with a wheel truck having a cross beam and wheels mounted in said truck, and with brake mechanism including brake-hangers and brake heads, a guiding device comprising a pair of transversely disposed rods pivotally hung at their inner ends upon said cross beam, the outer ends of said rods being branched, one branch of each rod being arranged to pivotally and adjustably connect the brake head on that side with the brake hanger and the other branch being adjustably connected with the brake head at a point below the pivotal attachment of the latter with the brake-hanger.

7. In combination with a wheel truck having a cross-beam and wheels mounted in said truck, brake mechanism comprising a brake beam, brake-heads connected thereto and having outwardly-extending lugs, and transversely-disposed guide rods pivotally hung at their inner ends upon said cross beam and at their outer ends pivotally connected with said lugs to prevent lateral movement of said brake-heads.

WILLIAM H. JONES.

Witnesses:
  LOUIS B. ERWIN,
  ROBERT DOBBERMAN.